May 11, 1965    L. L. CRAWFORD ETAL    3,182,365
MEAT CASING CLAMP
Filed Jan. 11, 1963
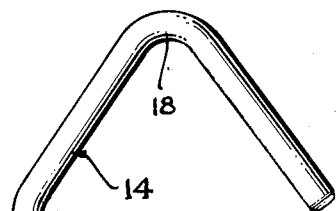
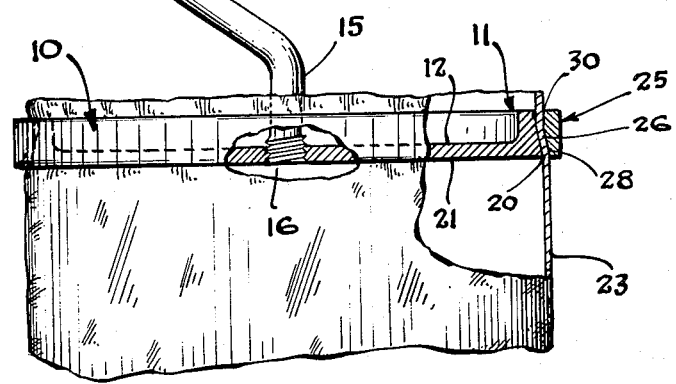
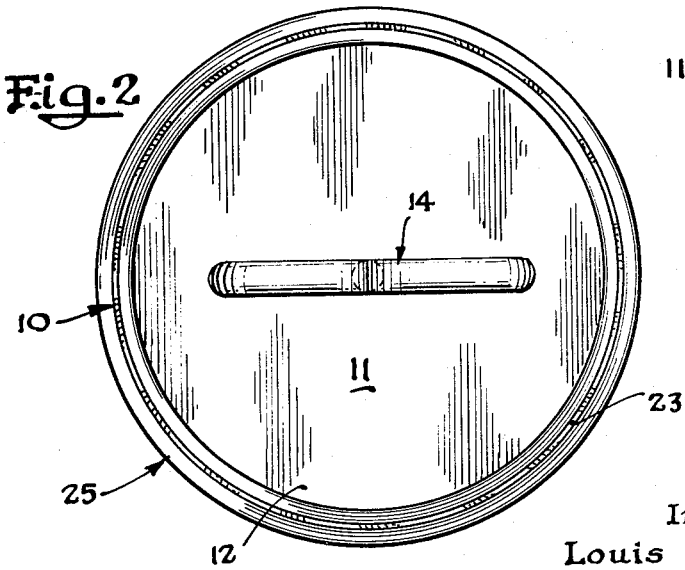
Inventors
Louis L. Crawford
B. S. Harrington, Jr.
By
Attorney 3,182,365
MEAT CASING CLAMP
Louis L. Crawford, Chicago, Ill., and Bert S. Harrington, Jr., Chamblee, Ga., assignors to Chemetron Corporation, Chicago, Ill., a corporation of Delaware
Filed Jan. 11, 1963, Ser. No. 250,796
9 Claims. (Cl. 24—30.5)

This invention relates to a device for handling and shaping meat products. More particularly, the present invention relates to a clamping device for meat casings which gives a flat end to the product as well as serves as a support for the meat during the processing thereof.

The usual filling of a sausage casing requires that the cylindrical casing be tied off at one end while the casing is filled with the desired meat product. This results in the end of the sausage having a rounded or curvilinear end. In slicing the meat, this rounded end is cut off and wasted. After the filling operation, the cased meat is subjected to further processing such as cooking, smoking, curing, etc. Some means for supporting the lengths of sausage must be provided and the normal procedure is to provide a loop formed from the cord employed to tie off the casing.

From what has previously been stated, it is apparent that the manner of filling and tying sausage casings which is prevalent in the industry today is wasteful and time consuming. Through the present invention, a novel clamping device is provided which eliminates any wasting of the meat product and at the same moment eliminates the need for tying the casings.

It is therefore an object of the present invention to provide a novel device for handling lengths of sausage.

It is a further object of the present invention to provide a clamping device for quick and secure engagement with a sausage casing which reduces time in handling.

It is also an object of the present invention to provide a novel supporting means for a length of sausage which will render a flat end to the length of meat after the casing is filled.

These and other objects of the present invention will be readily appreciated by reference to the following detailed description when considered in conjunction with the accompanying drawing showing an embodiment of the invention wherein:

FIGURE 1 is an elevational view of the present invention partially in vertical section.

FIGURE 2 is a top plan view of the device of FIGURE 1.

FIGURE 3 is a fragmentary view illustrating the engaging action of the present clamp.

Proceeding to a detailed description, clamping device 10 comprises a rigid inner plate member 11 having an annular configuration and a dished out portion 12 at the top. A hook member 14 is firmly secured in plate 11 by screwing stem 15 in the center of plate 11 by means of threads 16. By placing stem 15 in the center of plate 11 and having the engagement portion 18 of the hook also centrally disposed, plate 11 will assume a true horizontal position when it is suspended from a suitable support (not shown).

A tapering, circumferential, flat surface 20 extends laterally and around the periphery of plate 11. The angle of taper is about 5° as measured from the normal axis of annular plate 11 or from a true plumb position when the plate is suspended from a support. The preferred range of taper is from about 5° to 10°. It will be noted that the angle of taper is outwardly in a direction away from hook 14 and the top of plate 11. Plate 11 also has a solid, smooth end surface 21 joining the most outwardly tapering point of surface 20.

An ordinary meat casing 23 is held against tapering surface 20 by ring member 25 which has a tapering inner surface 26 wherein the smallest diameter is at least smaller than the largest diameter of plate 11 so that ring 25 will seat itself on tapering surface 20 in an interfering manner. The movement of ring 25 is thereby restricted in a direction away from hook 14. Obviously, because of the taper of plate 11 and ring 25, ring 25 must be placed over hook 14 to engage plate 11 in the previously described manner. The inner surface 26 of ring 25 has a tapering portion 28 at one end with an angle of taper approximately the same as the taper of surface 20. This provides for quick placement on plate 11 when ring 25 is placed over hook 14 and first engages the narrowest taper of surface 20. Disposed midway within ring 25 is an engagement point or surface 29 formed by the jointure of tapering portion 28 and straight wall section 30. Engagement point 29 when seated on surface 20, and with casing 23 therebetween, will constrictingly hold casing 23 against plate 11 which will be more fully apparent in the explanation of the use of the clamp to follow.

In normal operation of a sausage filling line, the casing 23 will arrive at an operator who is to prepare it for filling. The smallest inner diameter portion of ring 25 which is engagement point 29, and likewise wall 30, is large enough to permit ring 25 to be slipped over the hand and onto the arm of the operator. In the preferred embodiment, ring 25 has an internal diameter of about 4 inches and a width of about ⅜" to allow several of the rings to be accommodated on the arm at one time. If the operator is right handed the rings should be placed on the left arm with straight wall section 30 entering first. Likewise, hook 14 will be grasped in the left hand with surface 21 squarely facing casing 23. Casing 23 is placed over surface 20 with the right hand. Sufficient casing should be placed around plate 11 so that a small portion extends above or beyond plate 11 and can be held with the fingers on the left hand around hook 14 or against dished out portion 12. While the hook and the casing is being held by the left hand, a ring 25 is grasped by the right hand with large portion 28 directed toward plate 11. Ring 25 is pulled over the left hand and consequently over hook 14, casing 23 and onto tapering surface 20. The inner surface 26 of ring 25 and particularly portion 29 will frictionally engage the casing in a progressively tight manner and squeeze it against surface 20 as it moves in a direction away from hook 14. This frictional engagement will securely hold the casing on the clamp while it is filled with the desired meat product from the opposite end. After filling, the remote end is closed off and the resulting length of casing is hung from a suitable support such as multistationed conveyor. Hook 14 is of the open face variety to provide for quick engagement and is centrally located with respect to plate 11 so that the filled casing and plate 11 hang plumb. The filled casing is then processed depending on the type of product while supported by clamp 10. Throughout the processing, the weight of the meat product in the casing will tend to pull casing over surface 20, however, in doing so, the casing will also frictionally pull against ring 25 causing it to seat itself more tightly against surface 20 with the result that casing 23 is more firmly squeezed between plate 11 and engagement point 29 of ring 25.

After processing, clamp 10 is removed from casing 23 by merely slipping ring 25 off of casing 23 and tapered surface 20 in the direction toward the narrowing taper of plate 11. The encased sausage will have a flat end due to the contacting flat end surface 21. A suitable flat end piece can be secured in place of clamp 11 around the end of casing 23. The length of meat sausage is then ready for storage or shipment. Clamp 10 can then be returned to the sausage filling station for reuse.

Plate 11 as well as ring 25 and hook 14 are molded of stainless steel. Other rigid or semirigid materials which can be sterilized and are relatively noncorrosive in nature can, however, be used instead. Examples of these are: aluminum and molded fiberglass.

Casing 23 is composed of the customary semirigid and semipermeable plastic materials which allows smoke to penetrate through the casing yet holds the product in a firm position. The present clamp is operable on any casing composed of a semirigid material.

It will thus be seen that through the present invention there is provided a novel clamping means for meat casings which is simple in design, requiring no complicated machining or molding and which is quick and easy to manipulate yet effective in its engagement with a casing. Only two pieces of apparatus, namely, plate 11 and ring 25 need be handled to secure a casing for later filling and processing. Since rings 25 can be placed over the hand of the operator and are only ⅜" in width several can be carried by the arm of the operator for fast manipulation. At the same time, the clamp is easily and quickly separated from casing 23 after filling and is reusable. The normal curved ends of sausage are also eliminated which obviates needless waste.

It will be understood that other forms will be suggested to those skilled in the art and that it is intended to include all such that do not depart from the spirit of this invention within its scope so best defined in the appended claims wherein there is claimed.

We claim:
1. A combined clamp and support for meat casings comprising an inner member presenting a solid end surface and a tapering peripheral outer surface for receiving a casing therearound, means carried by said inner member for attachment to a support, said peripheral surface tapering outwardly in a direction away from said means, and an outer member having an inner surface for interfering and seating relationship with the tapered surface of said inner member to limit the movement of said outer member away from said means, when said meat casing is placed over the outer surface of said inner member and said outer member is placed over the casing, so that a force exerted on the casing away from said clamp will cause said outer member to more firmly force the casing against the outer surface of the inner member.

2. The combined clamp and support as defined in claim 1 wherein the outwardly tapering surface of the inner member terminates in said end surface forming a substantially flat end wall.

3. The combined clamp and support as defined in claim 2 wherein the peripheral surface of said inner member has an annular configuration and the outer member comprises a ring.

4. The combined clamp and support as defined in claim 3 wherein the smallest diameter of the inner surface of said ring member is sufficient to allow the ring to be placed over the hand and onto the arm of the operator.

5. The combined clamp and support as defined in claim 4 wherein said means for attachment is a hook member positioned to allow said inner member and said ring to hang plumb when said hook member engages a suitable support.

6. A combined clamp and support for meat casings comprising an inner plate member presenting an end surface and a substantially flat circumferential outer surface for receiving said casing therearound, a hook member carried by said plate member at one end thereof, said circumferential surface tapering outwardly at an angle ranging from about 5° to about 10° in a direction away from said one end, and an outer ring member for interfering and seatable engagement on the flat surface of said inner member, said ring member having an inner taper at one end approximately the same as the taper of said inner member, so that when said meat casing is placed over the outer surface of said inner member and said ring is placed over the casing, a force exerted on the casing away from said clamp will cause said ring member to more firmly force the casing against the outer surface of the inner member.

7. A combined clamp and support as defined in claim 6 wherein the tapering surface of the ring member terminates in a small diameter portion having a diameter less than a given diameter of said outer surface of presenting an engagement surface for constricting the casing against the outer surface of the inner member.

8. The combined clamp and support as defined in claim 7 wherein said small diameter portion is the smallest inner diameter of said ring member and is sufficient to allow the ring to be placed over the hand and onto the arm of the operator.

9. The combined clamp and support as defined in claim 8 wherein said hook member comprises an open portion for engagement on a suitable support.

References Cited by the Examiner
UNITED STATES PATENTS

| 422,274 | 2/90 | Wilkinson | 45—24.8 |
| 424,388 | 3/90 | Weigel | 24—136 |
| 682,271 | 9/01 | Post | 45—24.7 |
| 1,075,399 | 10/13 | Carter | 217—76 |
| 2,416,150 | 2/47 | Botls | 24—263 |

FOREIGN PATENTS 507,848   7/20   France.

DONLEY J. STOCKING, *Primary Examiner.*